(12) United States Patent
Prasatek

(10) Patent No.: US 6,652,024 B2
(45) Date of Patent: Nov. 25, 2003

(54) REMOVABLE CENTER CONSOLE

(75) Inventor: Craig Prasatek, Rochester, MI (US)

(73) Assignee: Magna Seating Systems, Inc., Aurora (CA)

(*) Notice: Subject to any disclaimer, the term of this patent is extended or adjusted under 35 U.S.C. 154(b) by 91 days.

(21) Appl. No.: 09/740,186

(22) Filed: Dec. 18, 2000

(65) Prior Publication Data

US 2001/0035670 A1 Nov. 1, 2001

Related U.S. Application Data

(60) Provisional application No. 60/172,268, filed on Dec. 17, 1999.

(51) Int. Cl.[7] ................................................ A47C 7/62
(52) U.S. Cl. ............................ 297/188.2; 297/188.19; 297/188.1; 297/411.24; 297/188.08
(58) Field of Search ......................... 297/188.01, 188.1, 297/188.08, 188.09, 188.2, 411.24, 188.19, 115

(56) References Cited

U.S. PATENT DOCUMENTS 3,863,563 A  *  2/1975  Popeil .......................... 100/102

* cited by examiner

Primary Examiner—Peter M. Cuomo
Assistant Examiner—Erika Garrett
(74) Attorney, Agent, or Firm—Clark Hill PLC

(57) ABSTRACT

A seat assembly for use in an automotive vehicle comprising a seat cushion extending between a front portion and a rear portion for supporting a seat occupant on the seat assembly and a seat back extending longitudinally between a lower portion coupled to the rear portion of the seat cushion and an upper portion. The seat back includes a front support surface for supporting the seat occupant in an upright seating position. A cavity is recessed in the seat cushion between the front portion and the rear portion. A center console is seated in the cavity forming a planar portion of the seat cushion. A support mechanism is coupled between the center console and the seat cushion for removably securing the center console between a secured position recessed in the cavity and a detached position released from attachment to the seat cushion and removed from the cavity. The support mechanism includes a support rod for supporting the bottom of the center console and a pair of opposing spring bias detent tabs for releasably engaging apertures in opposing side walls of the console for removably securing the console in the secured position.

5 Claims, 3 Drawing Sheets

REMOVABLE CENTER CONSOLE

This application claims the benefit of provisional application 60/172,268 filed Dec. 17, 1999.

BACKGROUND OF THE INVENTION

1. Field of the Invention

The present invention relates to a seat assembly having a center console, and more particularly, to a center console which is removably secured within a cavity of the seat assembly.

2. Description of the Related Art

Seat assemblies for use in automotive vehicles typically include a generally horizontal seat cushion for supporting an occupant in the seat and a generally upright seat back coupled to the seat cushion. The seat assembly may be split-type seat defined by a left seat portion and a right seat portion. Often, a center seat portion or a center console is positioned between the left and right seat portions. For example, U.S. Pat. No. 5,848,820 discloses a vehicle rear seat assembly having a left and right seat cushion portion and a seat back. The rear seat assembly further includes a center seat portion which includes a center seat portion base with a seat cushion on one side thereof and a utility compartment on the opposing side of the base. The center seat portion is pivotally mounted between the left and right seat portions for pivotal movement between a collapsed position in which only the seat cushion is exposed to facilitate seating thereon, and an upright position for facilitating access to the utility compartment.

It remains desirable, however, to provide a center seat, or center console, which provides not only a center seat portion to the seat assembly and a utility compartment, but also which is removable from the seat assembly for use as a portable storage console.

SUMMARY OF THE INVENTION

The present invention relates to a seat assembly for use in an automotive vehicle comprising a seat cushion extending between a front portion and a rear portion for supporting a seat occupant on the seat assembly and a seat back extending longitudinally between a lower portion coupled to the rear portion of the seat cushion and an upper portion. The seat back includes a front support surface for supporting the seat occupant in an upright seating position. A cavity is recessed in the seat cushion between the front portion and the rear portion. A center console is seated in the cavity forming a planar portion of the seat cushion. A support mechanism is coupled between the center console and the seat cushion for removably securing the center console between a secured position recessed in the cavity and a detached position released from attachment to the seat cushion and removed from the cavity.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
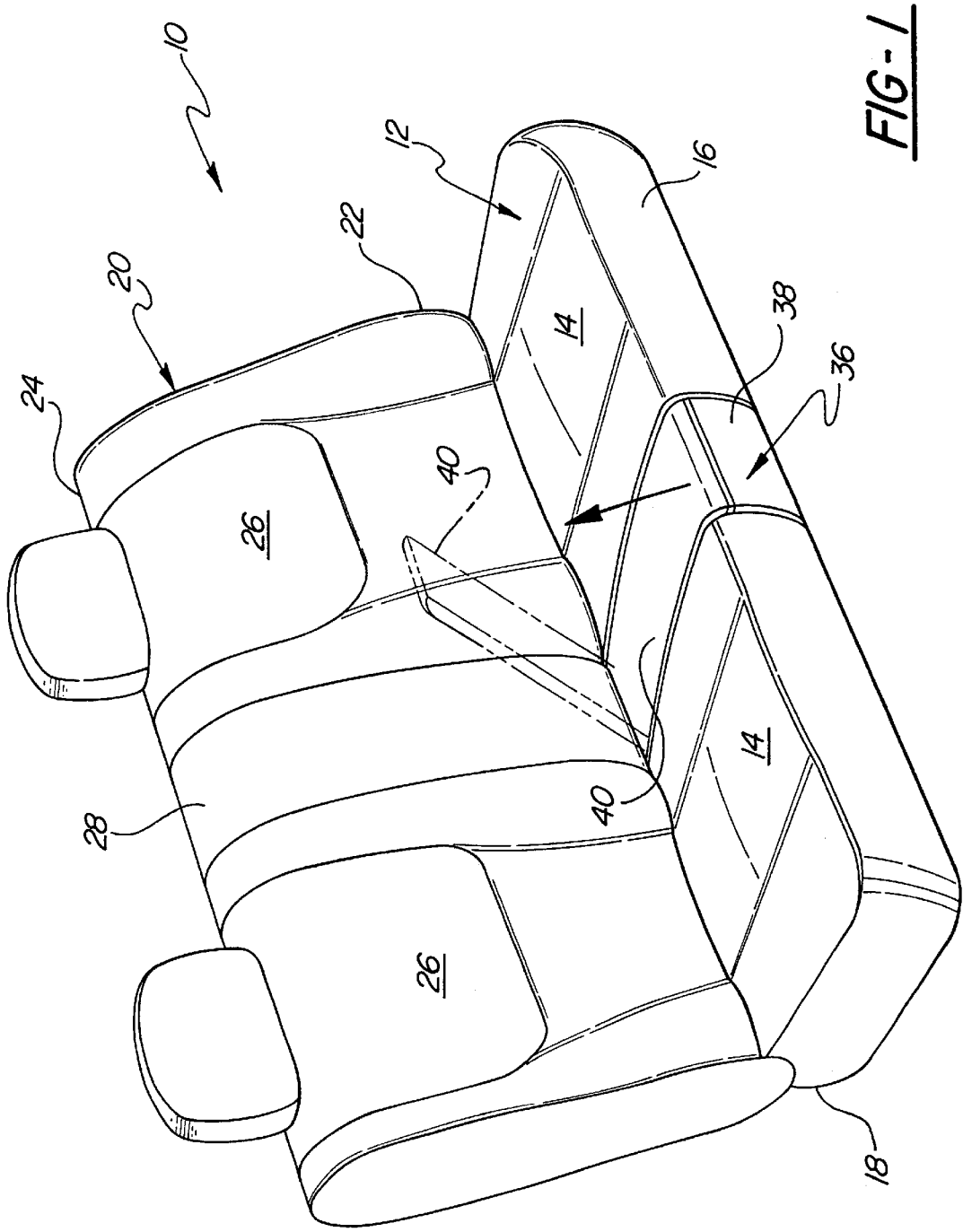
FIG. 1 is a perspective view of a seat assembly and center console according to the present invention.

Referring to FIG. 1, a seat assembly is generally depicted at 10 for use in an automotive vehicle (not shown). The seat assembly 10 includes a generally horizontal seat cushion 12 having an upper support surface 14 extending between a front portion 16 and a rear portion 18 for supporting a seat occupant on the seat assembly 10. The seat assembly 10 further includes a seat back 20 extending longitudinally between a lower portion 22 coupled to the rear portion 18 of the seat cushion 12 and an upper portion 24 opposite the lower portion 22. The seat back 20 also includes a contoured front support surface 26 extending between the lower portion 22 and the upper portion 24 for supporting the seat occupant in an upright seating position.

The seat assembly 10 includes an generally rectangular armrest 28 pivotally connected to the seat back 20 for movement between a generally horizontal use position supported on the upper support surface 14 of the seat cushion 12 and an upright stowed position recess within the front support surface 26 of the seat back 20 as is commonly known in the art.

Figure 2:
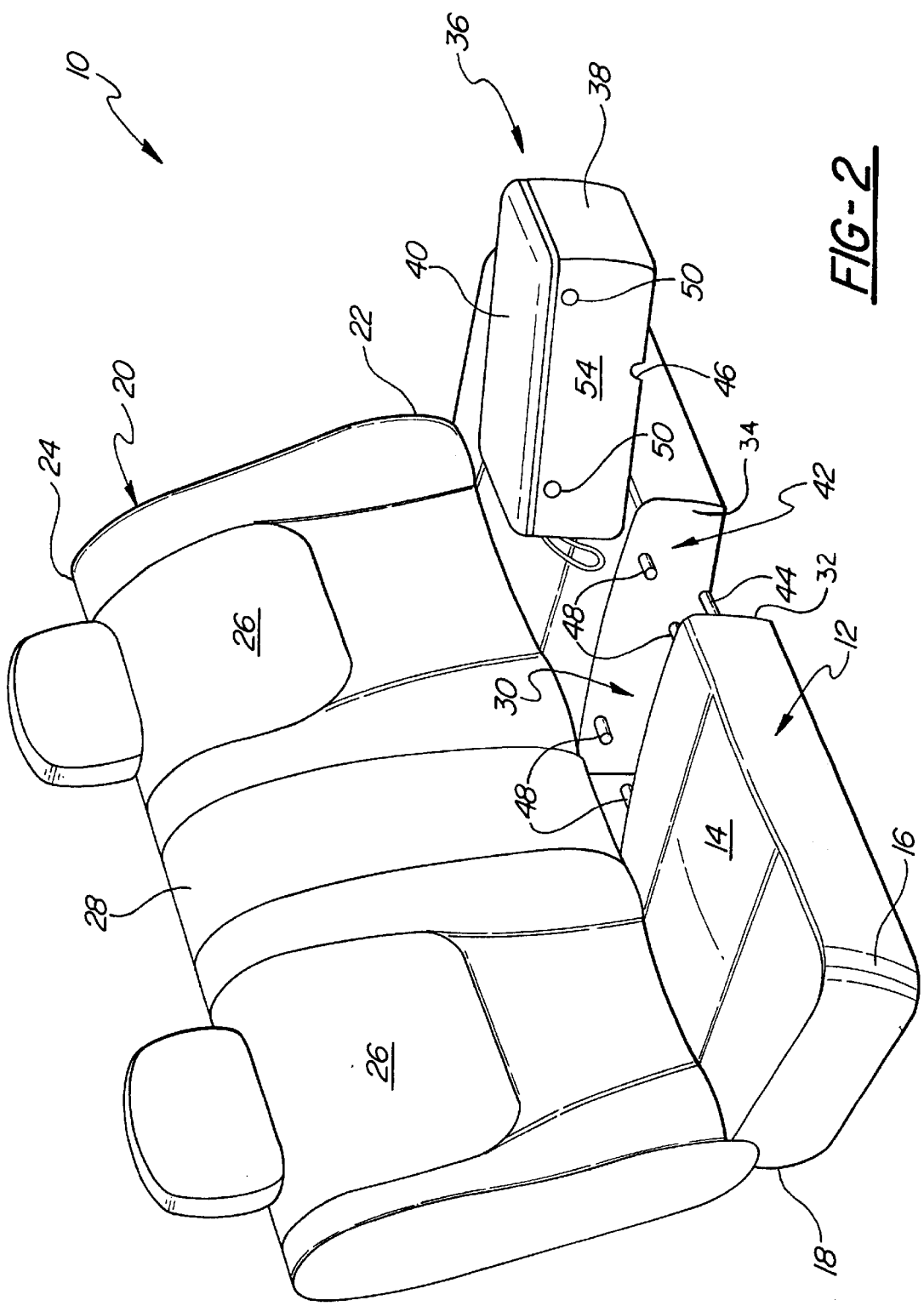
FIG. 2 is a perspective view of the seat assembly and center console removed from the seat assembly.

Referring to FIG. 2, the seat assembly 10 includes a generally rectangular cavity depicted at 30 recessed within the upper support surface 14 of the seat cushion 12 and extending between the front portion 16 and the rear portion 18. In the embodiment of FIGS. 1 and 2, the cavity 30 is formed generally in the center of the seat cushion 12, i.e. between adjacent left and right portions of the seat assembly. The cavity 30 is defined by spaced apart, parallel side walls 32, 34 projecting into the seat cushion 12 and extending between the front portion 16 and the rear portion 18.

The seat assembly 10 further includes a center console 36 positionable in the cavity 30 between the side walls 32, 34 for forming a continuously planar surface of the seat cushion 12. The center console 36 in the preferred embodiment of FIG. 1 includes a storage bin 38 accessible by the seat occupant for storing various article therein and a lid 40 for closing the storage bin 38.

The seat assembly 10 includes a support mechanism 42 coupled between the center console 36 and the seat cushion 12 for removably securing the center console 36 between a secured position recessed in the cavity 30 and a detached position released from the seat cushion 12 and removed from the cavity 30. More specifically, the support mechanism 42 includes a cylindrical support rod 44 for matingly engaging an arcuate notch 46 in the bottom of the storage bin 38 for supporting the center console 36 in the cavity 30. The support mechanism 42 further includes a plurality of retractable detent tabs 48 which are received in corresponding apertures 50 in the sidewalls of the storage bin 38 for removably securing the center console 36 to the seat cushion 12 and within the cavity 30 in the secured position. The retractable detent tabs 48 may be spring loaded to retract into the side walls 32, 34 to allow the center console 36 to be removed from the cavity 30 in the detached position.

Figure 4:
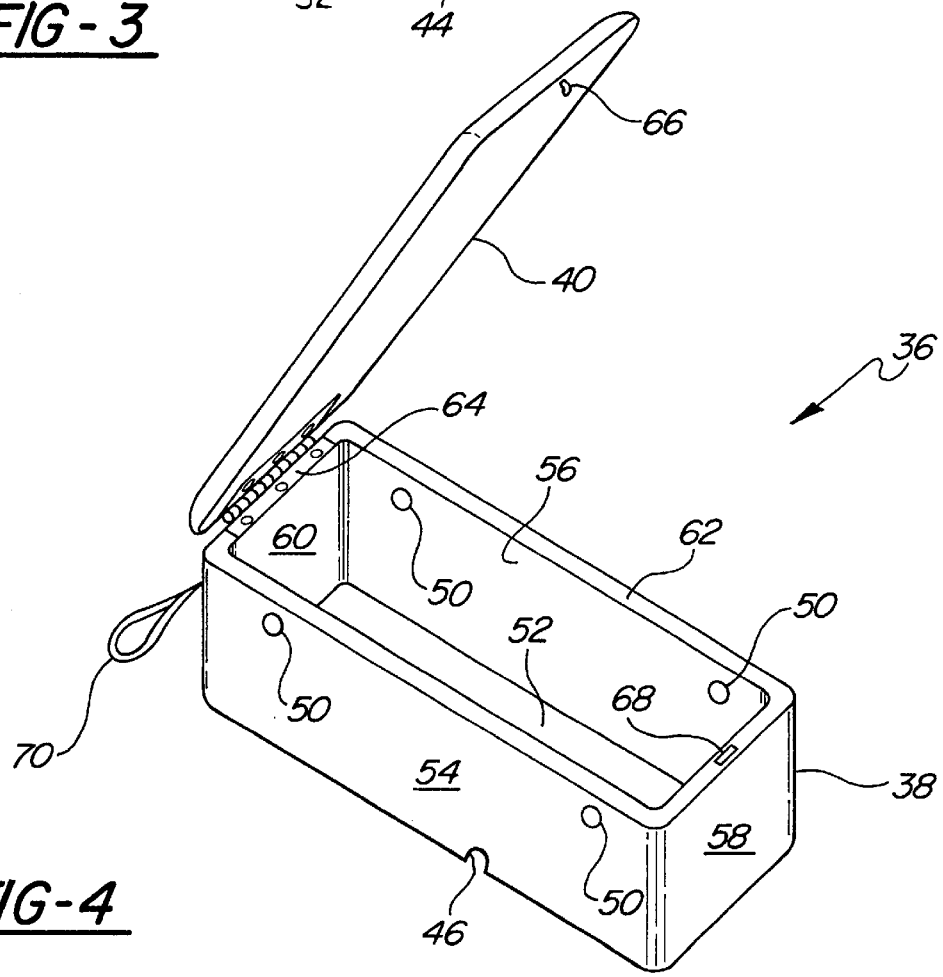
FIG. 4 is a perspective view of the center console with the lid in an open position.

Referring to FIG. 4, the storage bin 38 of the center console 36 includes a bottom surface 52 extending between spaced apart and generally parallel side walls 54, 56 and spaced apart and generally parallel front and rear walls 58, 60. Each of the walls 54, 56, 58, 60 extend upwardly and generally vertically from the bottom surface 52 to a peripheral upper rim 62 defining an opening into the storage bin 38.

A piano-type hinge 64 pivotally connects the lid 40 to the rear wall 60. A latch 66 is attached to the lid 40 for receipt in an opening 68 in the front wall 58 of the bin 38 for latching the lid 40 in a closed position covering the bin 38. The apertures 50 are positioned and spaced apart along each of the side walls 54, 56 of the storage bin 38 and extend therethrough for receiving the respective detent tabs 48 therein. The console 36 may further include a strap 70 or handle for carrying the portable console 36 when removed from the seat cushion 12 in the detached position.

Figure 3:
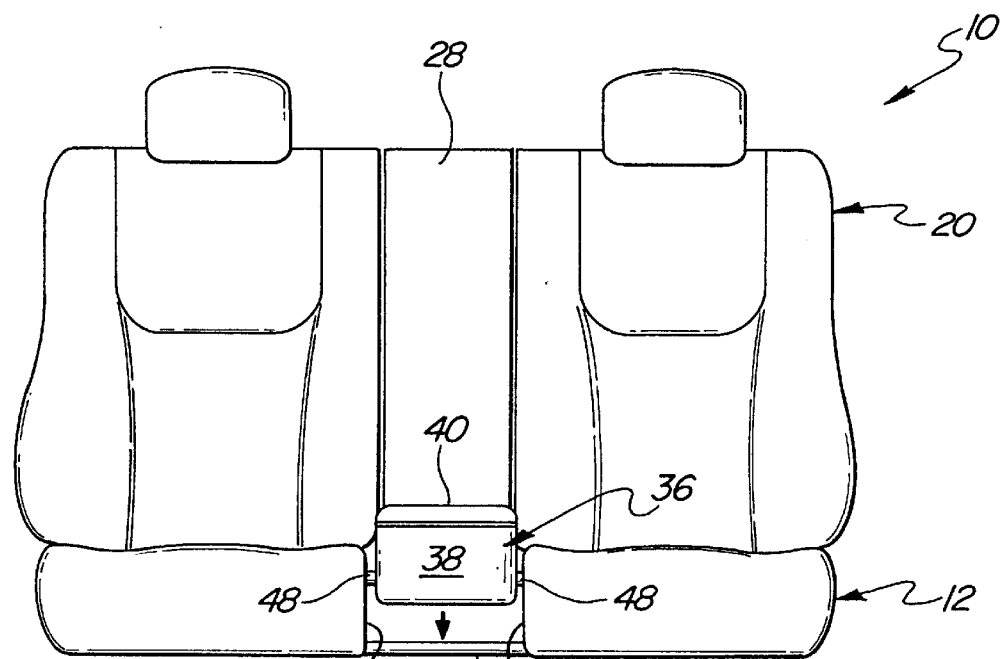
FIG. 3 is a front plan view of the seat assembly and the center console being attached to the seat assembly.

In operation, referring to FIGS. 2 and 3, with the center console 36 in the detached position removed from the seat cushion 12, the console 36 may be utilized as a portable storage device. To secure the console 36 to the seat cushion 12, the storage bin 38 is aligned with the cavity 30, between the opposing side walls 32, 34, and between the front portion 16 and rear portion 18 of the seat cushion 12. The console 36 is lowered into the cavity 30 until the side walls 54, 56 of the bin 38 engage the opposing detent tabs 48 of the support mechanism 42. The detent tabs 48 are spring bias outwardly, or toward the opposite side wall of the cavity 30 and therefore, engage and press against the side walls 54, 56 of the bin 38. The console 36 continues to be lowered into the cavity 30 until the detent tabs 48 are received in the apertures 50 in the respective side walls 54, 56 of the bin 38. The support rod 44 is further received within the arcuate notch 46 in the bottom surface 52 of the bin 38 to support the console 36 in the cavity 30. With the lid 40 in the closed position, the lid 40 will be aligned flush with the upper support surface 14 of the seat cushion 12.

To remove the console 36 from the seat cushion 12, the lid 40 is pivoted to an open position providing access to the interior of the storage bin 38. The detent tabs 48 are depressed through the apertures 50 and released therefrom. The console 36 may then be lifted and removed from the cavity 30 in the detached position for use as a portable storage device and console.

It should be appreciated that the center console 36 may employ a modular design to vary between a portable storage container, a child's toy box or the like to accommodate various seat occupant desires.

The present invention has been described in an illustrative manner. It is to be understood that the terminology, which has been used, is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A seat assembly for use in an automotive vehicle comprising:

a seat cushion having an upper support surface extending between a front portion and a rear portion for supporting an occupant on said seat assembly and a cavity recessed in a portion of said upper support surface defined by spaced apart, parallel and opposing side walls extending between said front and rear portion;

a console seat in said cavity formed in said seat cushion, said console including a storage bin having a bottom surface extending between spaced apart and parallel side walls received in said cavity and a lid for covering said storage bin and aligning generally flush with the remaining and surrounding portions of said upper support surface; and a support mechanism coupled between said console and said seat cushion for removably securing said console to said opposing side walls within said cavity between a secured position recessed in said cavity and a detached position completely released from attachment to said seat cushion and removed from said cavity.

2. A seat assembly as set forth in claim 1 wherein each of said side walls of said storage bin include at least one aperture extending therethrough.

3. A seat assembly as set forth in claim 2 wherein said support mechanism further includes a pair of detent tabs supported within said cavity of said seat cushion adapted to be received in said respective apertures of said side walls of said storage bin for releasably securing said console in said secured position.

4. A seat assembly as set forth in claim 3 further including a seat back extending longitudinally between a lower portion coupled to said rear portion of said seat cushion and an upper portion, said seat back including a front support surface for supporting the seat occupant in an upright seating position.

5. A seat assembly as set forth in claim 1 wherein said support mechanism includes a support rod secured in said cavity between said opposing side walls thereof for engaging said bottom surface and supporting said storage bin in said secured position.

* * * * *